3,043,762
REACTOR CONTROL ROD ACTUATING SYSTEM
Cecil G. Martin, Cleveland, and Harold H. Humpal, Bedford, Ohio, assignors to Thompson Ramo Wooldridge Inc., a corporation of Ohio
Filed July 19, 1956, Ser. No. 598,837
10 Claims. (Cl. 204—193.2)

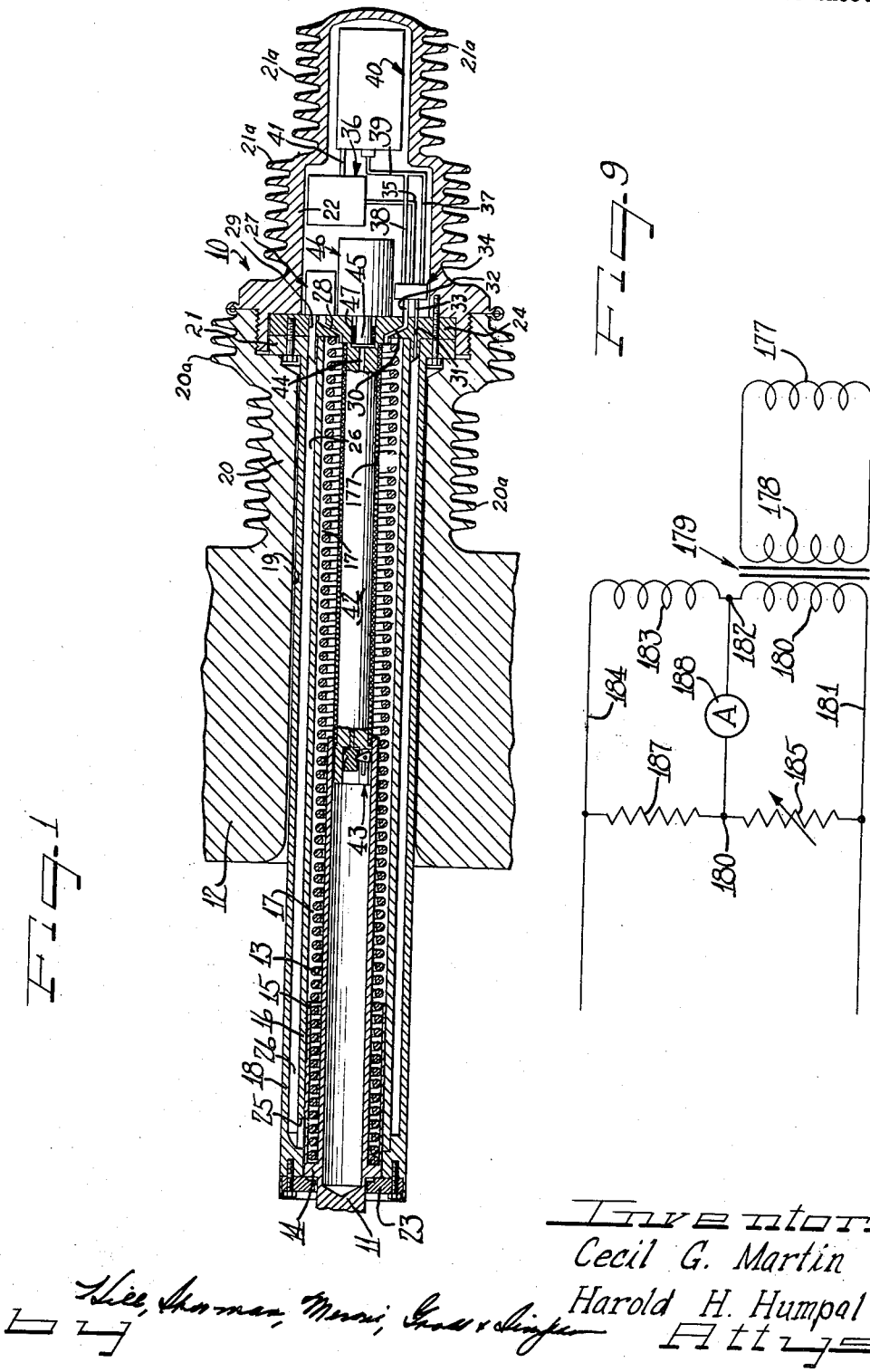

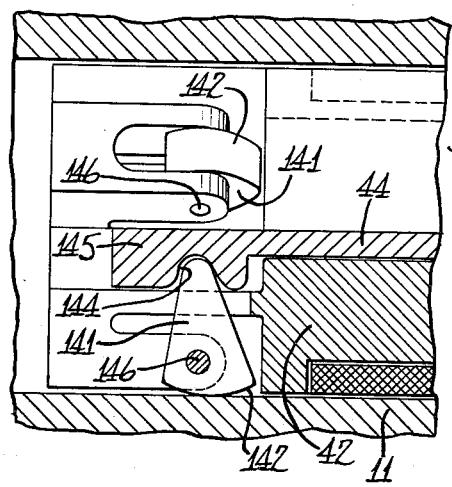
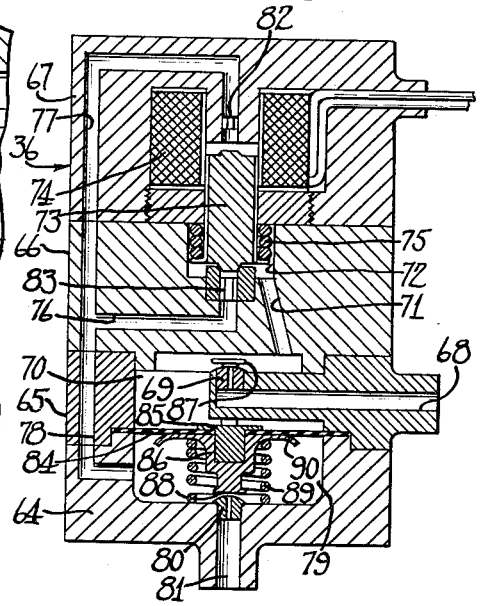
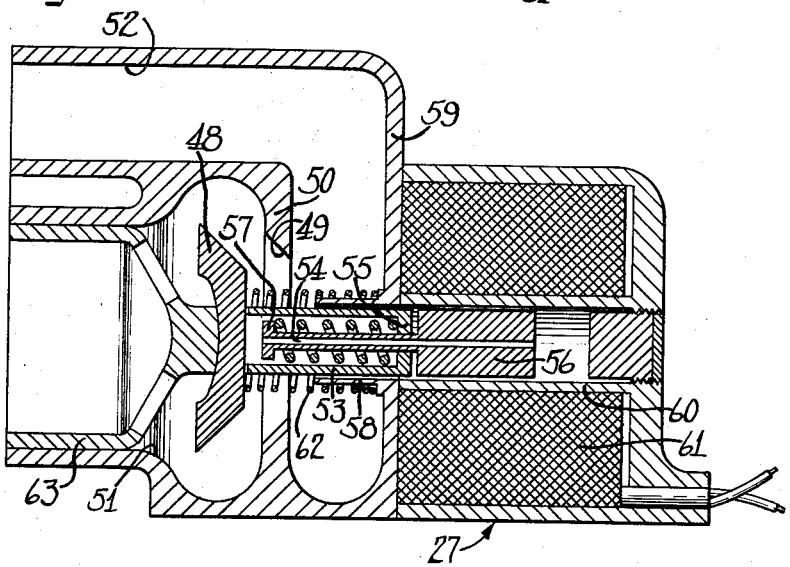

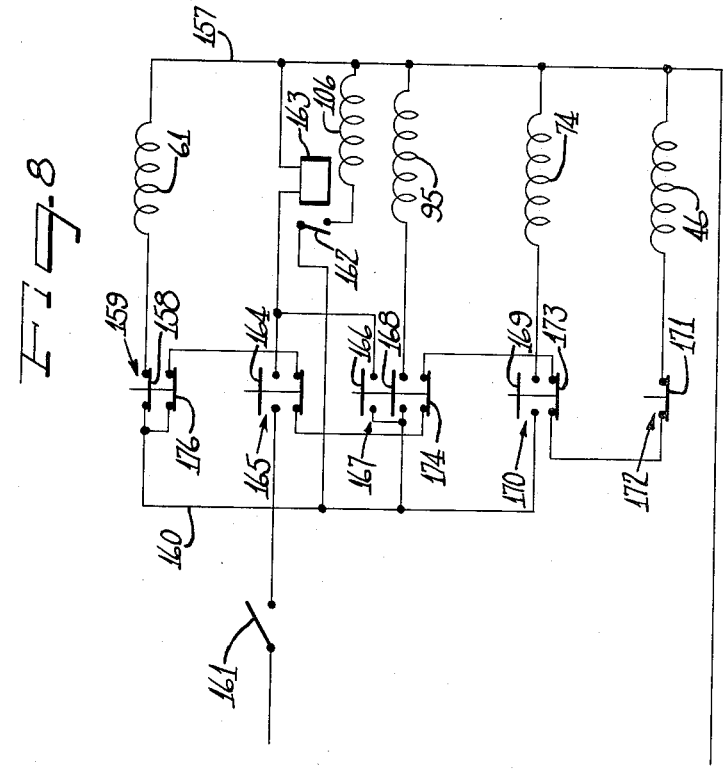
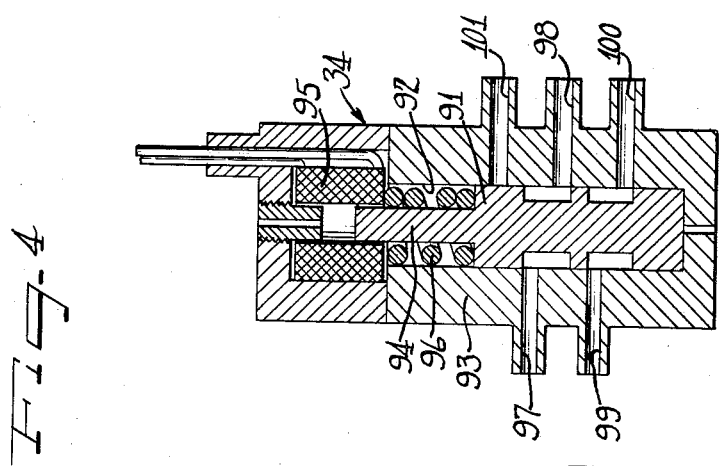

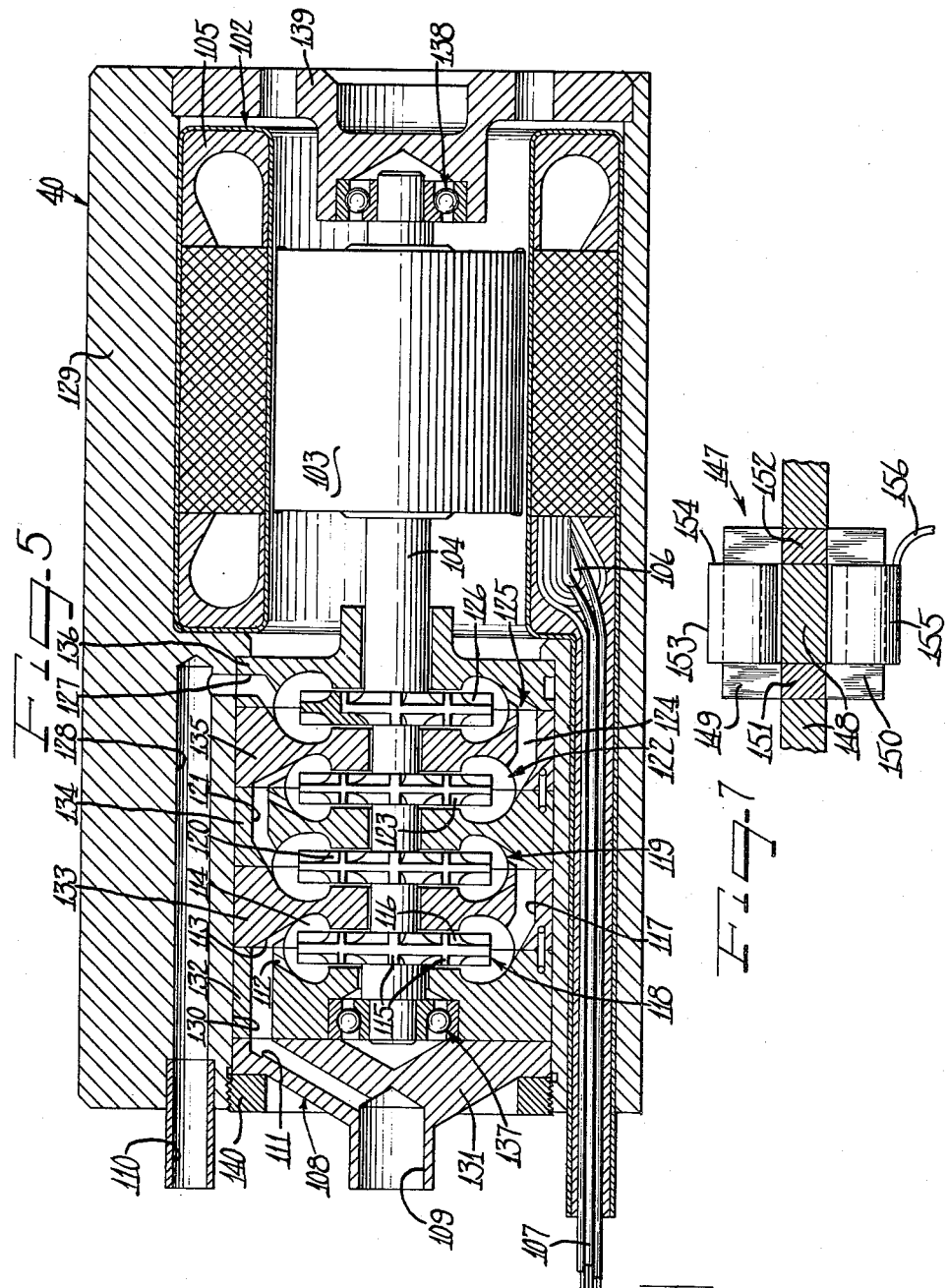

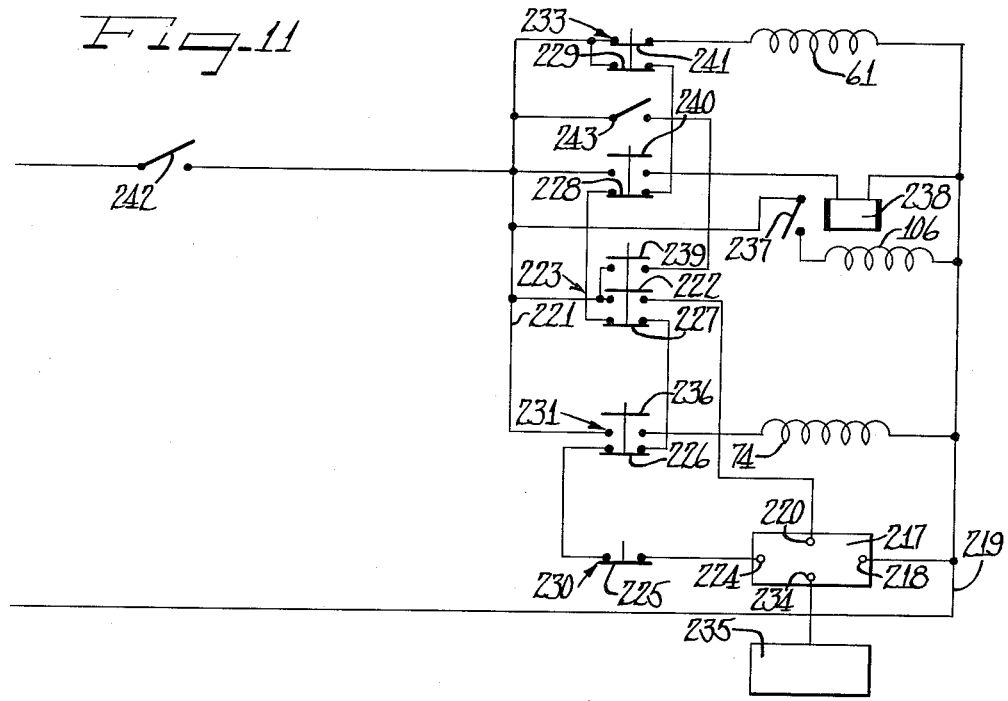
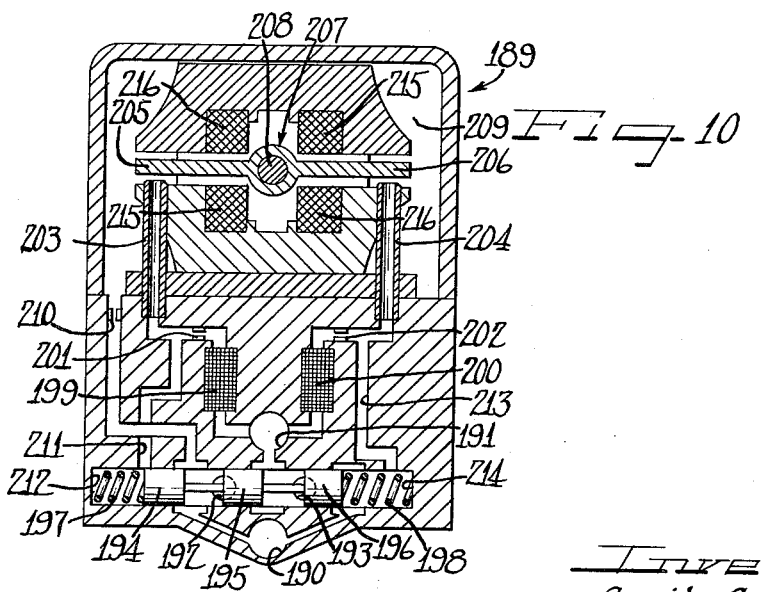

This invention relates to atomic reactor piles including their control mechanisms and particularly to a pressurized coolant type of pile having its reactor pressure vessel or casing of the type having an external projection or external thimble forming part of the coolant containing casing and enclosing the control rod means and its actuating mechanism. In our preferred exemplary embodiments, the coolant is a liquid, preferably water, at high pressures and temperatures.

This invention also relates to a complete, external thimble type of actuating system including the control rod for a pressurized liquid coolant type of atomic reactor and operable at different (and preferably predetermined) speeds to provide for a plurality of different functions. The control rod may be of neutron-absorbing material disposed in a reactor or "pile" which is surrounded by the chamber containing a heat-convecting fluid such as water. The reaction is arrested by movement of the rod into the "pile" and increased by movement of the rod out of the "pile." In normal operation, the rod is moved in and out relatively slowly to maintain the desired reaction rate. In discontinuing operation of the reactor, the rod is moved in at a relatively high rate of speed, and in an emergency it is essential that the rod be moved in as fast as possible.

The rod-actuating system must, therefore, be capable at both relatively slow and extremely high speeds and must also meet other stringent requirements. In particular, the rod-actuating mechanism must be connected to a source of energy and also to control means disposed at a remote location, and the connections must be such that a seal is maintained in the chamber containing the water or other heat-convecting fluid which is at a high pressure.

The mechanism should be as compact as possible and, at the same time, it is essential that overheating of any of the components be avoided. This problem is complicated by the fact that the water or other fluid used in the system is maintained at a high temperature.

It is further desirable that the power requirements be minimized, particularly in a power plant designed for a submarine, ship or the like. In addition, it is highly desirable that the apparatus be simple, rugged, reliable and durable, that it be insensitive to shocks, vibrations and tilting and that the components be readily accessible for maintenance and replacements.

This invention was evolved with the object of providing a reactor bar actuating system meeting the requirements and having the desirable features outlined above. It will be appreciated, however, that many features of the invention have general application in other and different types of systems.

In brief, the actuating system of this invention comprises a piston directly connected to the reactor control rod with movement of the rod being controlled by control of the fluid pressure acting on opposite sides of the piston. The water or other fluid of the reactor system is preferably used as the actuating fluid for the piston, to eliminate the need for sealing arrangements.

The reactor control rod is urged inwardly by a spring which exerts a force sufficient to move the rod inwardly at a very high rate of speed when fluid communication is established between the spaces on opposite sides of the piston. Such communication is controlled by a safety valve urged to an open position and closed by electromechanical actuating means such as a solenoid. With this arrangement, the reactor control rod not only can be moved in at a high rate of speed, but no energy from an external source is required to move the bar in, as would be required with other forms of actuators, such as those using an electric motor connected to the control rod through a reduction gearing. Power from an external source is required only when the bar is moved out which is accomplished at a slow rate and requires little power.

In the event of a power failure, the safety valve actuator is deenergized to open the valve so that the rod is automatically moved in at the maximum rate of speed.

Accordingly, this system not only minimizes the power required from an external source, but also insures safe and reliable operation.

In normal operation, as above described, the rod must be moved in and out at relatively slow, accurately controlled speeds to maintain the desired operation of the reactor. Inward movement is accomplished by allowing fluid flow at a slow rate from one side of the piston to the other under the action of the spring, and outward movement is accomplished by means of a pump which causes flow in the reverse direction. Preferably, a control valve is connected in series with the pump to control the rate of outward movement, and a reversing valve is connected between the piston and the control valve and pump, so that the same control valve operates for both inward and outward movement. The control valve is preferably of a special type which will maintain the flow rate constant at any desired adjustable value, so that the optimum rate of movement of the reactor bar is obtained.

When operation of the reactor is to be discontinued, it is desirable that the control rod be moved in at a relatively high speed, although not comparable to that required in an emergency. For this purpose, a restricted flow path is provided between the spaces on opposite sides of the piston. This may preferably be accomplished by adjusting the flow rate of the control valve in a special manner as will be described.

Due to the force exerted by the rod-actuating spring, a constant pressure differential across the piston would be required to maintain the position of the bar constant. Such would be difficult to maintain due to leakage past the piston. To prevent inward creeping movement of the piston, a brake is provided which is urged to a released position and actuated by a solenoid or the like to an engaged position. In the event of a power failure, the brake is thus automatically released. It will be apparent that by providing the brake, the pump need not be continuously operated, and hence its life can be greatly extended.

The entire hydraulic system including the pump and valves are preferably located within the outer wall of the casing for the water or other fluid of the reactor, so as to be effectively immersed and so as to eliminate the need for special sealing arrangements. An electric motor is used to drive the pump and it is desirable that it also be immersed but such produces a problem with respect to connection of the motor to an electrical supply source in that connection wires must be electrically insulated and at the same time a high pressure seal must be maintained which is difficult with ordinary electrical insulating materials. It has been proposed to use an induction motor having its rotor within the casing and the stator outside. However, the wall of the casing must be relatively thick and the motor would be very inefficient with a large gap between the rotor and stator, and, hence, the motor would have to be very large.

According to a specific feature of this invention, power is transferred through the wall of the casing by means of a special transformer arrangement in which the primary and secondary coils are respectively located outside and inside the casing. Power may be transferred by similar arrangements to the solenoids or other electro-mechanical actuators for the valves.

Another feature of the invention is in the provision of means for indicating the position of the control rod, comprising a plunger of magnetic material connected to the rod and movable in a coil or encircling the coil with a special circuit arrangement for indicating the impedance of the coil.

According to a further feature of the invention, the wall of the reactor casing is formed into an outwardly projecting tube-like housing structure in which the valves, valve actuators, brake actuator, pump and motor are disposed. This tube-like housing permits dissipation of the heat conducted from the reactor water and hence the temperatures of the components may be minimized. The electric motor is located at the extreme outer end of the housing so that it will be operated at the lowest temperature and have maximum efficiency with minimum size. Fins may be provided on the housing to provide additional heat dissipation. With this arrangement, a secondary coolant is not necessary and yet the assembly is very compact.

The system described above may be described as an "open loop control system" with the pump operated only when it is desired to move the rod outwardly. In some cases, it may be desirable to position the rod in accordance with an input signal. In this event, a closed loop control system is provided in which the pump operates continuously with the flow being controlled by a servo valve which is substituted for the reversing valve of the system described above. The brake, of course, is not used when using this system.

This invention contemplates other objects, features and advantages which will become more fully apparent from the following detailed description taken in conjunction with the accompanying drawings which illustrate preferred embodiments and in which:

FIGURE 1 is a longitudinal sectional view through a control rod actuating system constructed according to the principles of this invention;

FIGURE 2 is a sectional view through a safety valve of the system of FIGURE 1;

FIGURE 3 is a sectional view through a control valve of the system of FIGURE 1;

FIGURE 4 is a sectional view through a reversing valve of the system of FIGURE 1;

FIGURE 5 is a sectional view through a motor-pump assembly of the system of FIGURE 1;

FIGURE 6 is a sectional view of a brake assembly of the system of FIGURE 1;

FIGURE 7 is a detail view of a special transformer arrangement used in the system of FIGURE 1;

FIGURE 8 is a schematic wiring diagram for the electrical control circuit of the system of FIGURE 1;

FIGURE 9 is a schematic electrical diagram of a control rod position indicator for the system of FIGURE 1;

FIGURE 10 is a cross-sectional view of a modulating valve which may be substituted for the reversing valve of the system of FIGURE 1 for closed loop control; and FIGURE 11 is a schematic electrical wiring diagram for a closed loop control system.

As shown on the drawings:

Reference numeral 10 generally designates a control rod actuating system constructed according to the principles of this invention. The control rod (not shown) is affixed to the left-hand end of a plunger 11 which is moved to the left to move the control rod into the atomic pile to arrest the reaction and to the right to move the rod out of the pile and increase the reaction. A heat-convecting fluid, such as water, surrounds the pile and is contained within a casing having an outer wall 12, a small portion of which is shown in section in FIGURE 1. Accordingly, water is in the space to the left of the casing wall 12 and the atmosphere is in the space to the right of the casing wall 12, as viewed in FIGURE 1. The water may be under high pressure on the order of 2000 p.s.i. and may have a temperature on the order of 600° F.

The plunger is urged inwardly by a coiled compression spring 13 and is integrally connected through a wall portion 14 to a cylindrical sleeve portion 15 to form a piston movable within a cylindrical sleeve 16. The pressure of the water within the reactor casing is applied to the inner end of the piston and to allow inward movement under the action of the spring 13, the water is allowed to flow into a space or chamber indicated by reference numeral 17 within the cylindrical sleeve 16 to the right of the piston. To move the plunger outwardly (to the right as viewed in FIGURE 1), the water is pumped out of the space 17 into the reactor casing.

The sleeve 16 is affixed within a housing sleeve 18, the right-hand end portion of which is disposed in a cylindrical opening 19 in the casing wall 12, which is provided with an integral outwardly projecting tubular portion 20 with the inner surface of the portion 20 forming a continuation of the opening 19. The housing sleeve 18 has an annular flange portion 21 seated in an annular recess in the outer end of the tubular portion 20. A cup-shaped cap 22 is secured to the outer end of the tubular portion 20 to form a continuation thereof, the cap 22 providing a housing for various components of the system. An end plate 23 is secured to the inner end of the housing sleeve 18 in the path of the wall 14 to limit inward movement of the plunger 11, and an end plate 24 is secured to the flange portion 21 at the outer end of the housing sleeve 18. The coiled compression spring 13 engages the outer end plate 24 and extends inwardly about the right-hand end portion of the plunger 11 and within the piston skirt portion 15 to engage the wall 14.

An opening 25 is provided at the inner end of the cylinder sleeve 16 to provide communication between the water in the reactor casing and a chamber 26 within the housing sleeve 18 and around the cylinder sleeve 16. In an emergency, a safety valve 27 is opened which communicates with the chambers 17 and 26 through passages 28 and 29, respectively, in the outer end plate 24. As the plunger 11 approaches the end of its inward movement, the piston acts to restrict flow through the opening 25, the flow being even more restricted as the wall 14 approaches the wall 23, so that a damping action is automatically provided.

To effect outward movement of the control rod and to control inward movement at slower speeds, the chambers 17 and 26, respectively, communicate through passages 30 and 31 in the end plate 24 and conduits 32 and 33 with a reversing valve 34 which is connected through a conduit 35 to a control valve 36 and also through conduits 37 and 38 to a common conduit 39 connected to a motor-pump unit 40. A conduit 41 connects the control valve 36 and the motor-pump unit 40. The control valve 36, the reversing valve 34 and the motor-pump unit 40 are respectively illustrated in detail in FIGURES 3, 4 and 5 and will be described later.

The right-hand or outer end portion of the plunger 11 is hollowed to provide a sleeve portion which telescopes on a rod 42 formed integrally with and projecting inwardly from the outer end plate 24. A brake assembly 43 at the inner end of the rod 42 is arranged to engage the inner surface of the sleeve portion of the plunger to lock the same against movement when the control rod has been moved to a desired position, so that continuous operation of the pump is not necessary.

The brake assembly will be described in detail in connection with the detail view of FIGURE 6. The actuator thereof is connected to a rod 44 extending through the rod 42, the outer end of the rod 44 being connected to an armature 45 which is pulled outwardly upon energization of a solenoid coil 46 against the action of a coiled compression spring 47. The brake is disengaged when the rod is moved in and engaged only when the solenoid coil 46 is energized, so that the brake is automatically released upon a power failure.

Referring now to the enlarged cross-sectional view of the safety valve 27, FIGURE 2, this valve is of the poppet type to avoid any possibility of sticking. In particular, a valve member 48 is arranged to engage a valve seat 49 about an opening in a wall 50 between passages 51 and 52 which respectively communicate with the passages 28 and 29 in the end plate 24. The valve member 48 is integrally secured to the inner end of a sleeve 53. A pin 54 extends outwardly through a cap 55 on the outer end of the sleeve 53 and has its outer end portion secured to a solenoid armature 56. A coiled compression spring is disposed on the pin 54 within the sleeve 53 and acts between the cap 55 and the head on the inner end of the pin to resiliently urge the sleeve 53 and armature 54 together. The sleeve 53 and armature 54 move telescopingly in the cylindrical chamber defined in part by an inwardly projecting integral sleeve portion 58 on the outer wall 59 of the valve housing and in part by a sleeve portion 60 of a solenoid enclosure. A coil 61 wound on the sleeve 60 is effective when energized to move the armature 56 outwardly and move the valve member 48 against the seat 49.

A coiled compression spring 62 acts between the wall 59 and the valve member 48 to urge the valve member inwardly to its open position, such inward movement being limited by an apertured plug 63 in the passage 51. With this arrangement, the valve is closed only upon energization of the solenoid coil 61 and is automatically opened upon a power failure. It may also be noted that with the reactor control rod at a position outwardly away from its inward position, the water in the passageway 52 is at a higher pressure than the water in the passageway 51, which provides a pressure differential urging the valve 48 away from the seat 49, so that the valve would open upon the energization of the solenoid coil 61 even if the spring 62 were broken.

Referring now to FIGURE 3, the control valve 36 is arranged to maintain the flow between the chambers 17 and 26 constant at a certain relatively low rate for inward or outward movement of the reactor control rod in normal operation, and is also operable to maintain the flow from chamber 26 to chamber 17 constant at a certain higher rate when operation is to be discontinued.

The control valve 36 comprises a body in four sections 64, 65, 66 and 67. Water from the pump flows through the conduit 41 into a passage 68 and through a restricted port in a plug 69 into a chamber 70, and then through a passage 71 to a chamber 72 in which a valve member 73 is positioned. The valve member 73 is of magnetic material and is movable away from the position shown by energization of the solenoid coil 74, against the action of a coiled compression spring 75 which urges it to the position shown.

Depending upon the position of the valve member 73, the water flows from the chamber 72 into one or the other of a pair of passages 76 and 77 and thence through a common passage 78 into a chamber 79, thence through a restricted port in a plug 80 into a passage 81, and thence through the conduit 35 to the reversing valve 34.

In normal operation, the solenoid coil 74 is deenergized and the valve member 73 is in the illustrated position so that the flow is through the passage 77. A plug 82 is disposed in this passage and has a relatively small sized orifice therethrough. When operation of the reactor is discontinued, the passage 76 is used and a plug 83 having a larger sized orifice is positioned therein.

Means are provided for maintaining a substantially constant pressure drop across whichever one of the orifice plugs 82, 83 is in the flow path, so as to maintain a substantially constant flow rate. In particular, a diaphragm 84 is positioned between the chambers 70 and 79 and carries a pair of valve members 85 and 86. The valve member 85 has an arm 87 movable toward and away from the ported plug 69 and the valve member 86 has a terminal end face 88 movable toward and away from the ported plug 80. The arm 87 and the face 88 are urged away from the plugs 69 and 80 by a coiled compression spring 89 in the chamber 79 which engages a flange portion 90 of the valve member 86.

If the flow should increase, the pressure drop across the orifice 82 (or the orifice 83) will increase the pressure in the chamber 70 relative to that in the chamber 79. This will cause the diaphragm to move against the action of the spring 89 and will cause the arm 87 and face 88 to move toward the plugs 69 and 80 to automatically restrict the flow.

The purpose of using two jointly operated regulating valves is to balance reactions between the fluid and the valve members, the reaction between the fluid and the arm 87, the reaction between the fluid and the arm 87 being equal and opposite to the reaction between the fluid and the face 88. Thus, the position of the valve members is determined solely by the pressure differential between the chambers 70 and 78 and an extremely accurate regulation is obtained.

Referring now to FIGURE 4, the reversing valve 34 is a spool-type valve comprising a valve member 91 reciprocally movable in a bore 92 of a valve body 93 and having an end portion 94 which forms a solenoid armature movable into a coil 95 upon energization thereof, the coiled compression spring 96 acting to urge the valve member 91 to the illustrated position. In this position, a passage 97, which communicates with the chamber 17 through the conduit 32 and passage 30, is in communication with a passage 98 which communicates through a conduit 35 with the control valve. The passage 99, which communicates with the chamber 26 through the conduit 33 and the passage 31, is in communication with a passage 100 which communicates with the pump through the conduits 37 and 39. When the solenoid coil 95 is energized, the passage 97 communicates with a passage 101 connected through conduits 38 and 39 to the pump and the passage 99 communicates with the passage 98.

As shown in FIGURE 5, the motor-pump unit 40 comprises an induction type electric motor 102 having a squirrel cage rotor 103 on a shaft 104, the rotor 103 being rotatable in a field structure 105 including windings 106 connected to leads 107. For maximum efficiency and optimum starting characteristics, the motor 102 is preferably a three phase motor, but it will be apparent that a single phase motor could be used.

The motor 102 drives a pump 108 having an inlet 109 connected to the conduit 39 and an outlet 110 connected through the conduit 41 to the control valve 36. Water from the inlet 109 flows through a passage 111 and thence partially through a passage 112 and partially through a passage 113 to points at the periphery of an annular swirl chamber 114. The water is forced centrifugally by vanes 115 on a rotor 116 to flow out through an outlet passage 117 which is about 300° from the inlet passages 112 and 113 (FIGURE 5 not being a true section), the chamber 114 having an enlarged radius and area adjacent the outlet passage 117.

There is thus provided a centrifugal type pump section which is indicated generally by reference numeral 118. The water flows from the outlet passage 117 of the pump section 118 to the inlet of a similar pump 119 including a rotor 120, thence through a passage 121 to the inlet of another pump section 122 which includes a rotor 123, thence through a passage 124 to the inlet of another pump section 125 which includes a rotor 126 and thence through a passage 127 and a passage 128 to the outlet 110.

It will be noted that the rotors 116, 120, 123 and 126 are solid and they are mounted in axially spaced relation on the shaft 104. The inlets and vanes of the pump sections are arranged and formed in a manner to equalize forces in an axial direction, and with two inlets and two outlets on each side of the pump assembly, radial forces tend to balance also.

There is thus provided a regenerative centrifugal type of pump using solid rotors with only two frictioned faces exposed. It has been found that this type of pump is particularly advantageous in the actuating system of this invention. In particular, the centrifugal type of pump has a long life and is very reliable in operation. By using the regenerative type of pump, and with the solid rotor design with only two frictioned faces exposed, the same output is obtained with greatly reduced input over that that would be required with a conventional centrifugal pump, since friction losses are proportional to the fifth power of the diameter. The resultant increase in efficiency permits the use of a much smaller motor, and greatly reduces heat generation, which is extremely important in the system. It will be noted that the diameter of the pump rotors is less than that of the motor rotor 103.

The nature of the pump design is such as to permit ready assembly of the motor-pump unit. In particular, the unit comprises a casing 129 of generally tubular form in which the field structure 105 of the motor 102 is readily mounted. The casing 129 has a bore 130 into which a series of blocks 131—136 are readily positioned, the blocks 131—136 being formed to provide the various chambers and passages of the pump and having aligned central apertures through which the motor shaft 104 extends. One end of the motor shaft 104 is journalled by a ball bearing assembly 137 in the block 132 and the other end thereof is journalled by a ball bearing assembly 138 in a plate 139 at the motor end of the unit. In assembly, the field structure 105 is first installed, the plate 139 is then positioned, the shaft 104 with the rotor 103 is then moved into positoin to be journalled by the bearing 138, and the blocks 131—136 and rotors 116, 120, 123 and 126 are then slipped into position, after which a threaded locking ring 140 is screwed into the end of the bore 130 to lock the blocks in position.

Referring now to FIGURE 6, the brake mechanism 43 comprises three radially extending shoe elements 141 spaced 120° apart and having cam faces 142 at their radially outward ends which are wedged against the inner cylindrical surface of the sleeve portion of the plunger 11 when the control rod 44 is moved axially outward to the right by energization of the solenoid coil 46. The radially inner ends of the elements 141 extend into a recess 144 in an enlarged end portion 145 of the control rod 44 and the elements 141 are pivoted on pins 146 which are relatively close to the outer ends of the elements 141, so as to obtain force-multiplication lever action. The spring 47 exerts a force sufficient to move the plunger 11 outwardly against the force of the spring 13. This outward movement is sufficient to accomplish brake release even in the event of failure of the brake surfaces. The use of the force-multiplication lever arrangement, of course, makes it much easier to obtain this action with reliability.

Referring now to FIGURE 7, reference numeral 147 generally designates a special transformer arrangement of this invention used to transfer electrical power through the wall of the housing 22 without requiring passage of insulated conductors therethrough. In this figure, the wall of the housing 22 is illustrated in cross section and designated by reference number 148. A pair of generally U-shaped core elements of magnetic material, preferably laminated, are disposed with the ends of the legs thereof against aligned portions of the outer and inner surfaces of the wall 148. Plugs 151 and 152 of magnetic material are welded in openings in the wall 148 to complete a magnetic circuit between the core elements 149 and 150, the wall 148 being of non-magnetic material. A primary coil 153 is wound on the core element 149 outside the wall 148 and is connected through leads 154 to a source of electrical power outside the casing and a secondary coil 155 is wound on the core element 150 inside the wall 148 and is connected through leads 156 to a component such as the motor 102 inside the casing. With three phase power, three transformer arrangements will, of course, be required.

Referring now to the circuit diagram of FIGURE 8, one terminal of the safety valve actuating solenoid 61 is connected to a bus 157 and the other terminal thereof is connected through a normally closed contact 158 of an emergency button 159 to a bus 160 which is connected through an on-off switch 161 to one terminal of a source of power. A source of sixty cycle 110 volt alternating current may, for example, be used. It may here be noted that the solenoid 61, as well as other components of the electrical system, are shown connectable directly between the busses 157 and 160. Actually, a transformer arrangement such as described above in connection with FIGURE 7 is preferred and the primary coil of the transformer associated with each component is then connected in the manner as shown in the wiring diagram.

For energization of the pump drive motor 102, one terminal of a field winding 106 thereof is connected to the bus 157 and the other terminal thereof is connected through a normally open relay contact 162 to the bus 160. This is the connection with a single phase motor. If a three phase motor is used, as is usually preferred, three relay contacts are used to connect the three windings to a three phase line. The contact 162 is closed by energization of a relay or contact or coil 163 having one terminal connected to the bus 157 with the other terminal thereof connected through a normally open contact 164 of a "Rod Stuck" button 165 and also through a normally open contact 166 of a button 167 used to effect outward movement of the reactor control rod.

One terminal of the reversing valve actuating solenoid 95 is connected to the bus 157 and the other terminal thereof is connected to the bus 160 through a normally open contact 168 of the button 167. One terminal of the flow control valve actuating solenoid 74 is connected to the bus 157 and the other terminal thereof is connected to the bus 160 through a normally open contact 169 of a button 170 used to cause inward movement of the reactor control rod at the relatively rapid rate required in discontinuing operation of the reactor. One terminal of the brake actuating solenoid 46 is connected to the bus 157 and the other terminal thereof is connected through a normally closed contact 171 of a button 172, and through normally closed contacts 173, 174, 175 and 176 of the buttons 170, 167, 165 and 159, respectively, to the bus 160.

In operation, the on-off switch 161 is closed which will effect energization of the safety valve actuating solenoid 61 to close the safety valve 27 and will also cause energization of the brake solenoid 46 to engage the brake. In an emergency, the button 159 is actuated which will deenergize the solenoid 61 to open the safety valve 27 and to also deenergize the solenoid 46 to release the brake. Thus, the reactor control rod will be rapidly moved to its inward position, if it is at a position outward therefrom when the button 159 is actuated.

To cause outward movement of the reactor control rod, the button 167 is actuated to cause energization of the relay 163 and energization of the pump driving motor 102, to cause energization of the reversing valve solenoid 95 so as to cause flow out of the chamber 17 and into the chamber 26, and to deenergize the brake-actuating solenoid 46 so as to cause release of the brake under the action of the compression spring 47. In this operation, the flow control valve solenoid 74 is deenergized and the flow will be through the relatively small orifice of the plug 82 in the control valve 36 (FIGURE 3) so that the flow will be at a relatively slow rate which is maintained constant through operation of the diaphragm 84 of the control valve.

To cause inward movement of the reactor control rod at a relatively slow rate, the button 172 is actuated to deenergize the solenoid 46 and release the brake. This will allow flow from the chamber 26 through the reversing valve 34 into the inlet of the pump, from the outlet of the pump to the control valve 36, through the relatively small orifice of the plug 82 of the control valve 36 and from the outlet passage 81 of the control valve through the reversing valve 34 into the chambr 17. This, of course, will be at a relatively slow rate maintained constant by operation of the diaphragm 84.

To move the reactor control rod inwardly at a relatively rapid rate, as is required when temporarily discontinuing operation of the reactor, the button 170 is actuated which will cause deenergization of the solenoid 46 to release the brake and energization of the flow control valve solenoid 74, to allow flow from the chamber 26 to the reversing valve 34, through the pump and through the relatively large orifice of the plug 83 in the control valve 36, back through the reversing valve 34 to the chamber 17. This flow will be maintained substantially constant by operation of the diaphragm 84 which maintains a constant pressure drop across the fixed orifice 83.

To indicate the position of the reactor control rod, a coil 177 is wound on the fixed rod 42 and extends from a point adjacent the outer end plate 24 to a point adjacent the brake assembly 43. The sleeve portion of the plunger 11 surrounds the coil 177 to an extent determined by the degree of outward movement of the plunger 11, and determines the effective inductance of the coil 177. The sleeve portion of the plunger 11 is preferably of magnetic material to obtain maximum variation in the inductance of the coil 177.

Referring now to FIGURE 9, the coil 177 is connected to the secondary 178 of a transformer 179 which may have the construction of the transformer 147 illustrated in FIGURE 7. The transformer 179 has a primary 180 connected between a conductor 181 and a circuit point 182, the circuit point 182 being connected through an impedance coil 183 to a conductor 184. The conductors 181 and 184 are arranged to be connected to a suitable source of alternating current excitation, such as a source of 60 cycle alternating current. It will be appreciated that the voltage drop across the transformer primary 180 will vary as the inductance of the coil 177 varies. To measure the voltage drop across the primary 180, a bridge arrangement is used which includes a rheostat 185 having one terminal connected to the conductor 181 with its other terminal connected to a circuit point 186, the circuit point 186 being connected through a resistor 187 to the conductor 184. The voltage drop across the rheostat 185 will be fixed at a value determined by the adjustment of the same. A meter 188 is connected between the circuit points 182 and 186 to indicate variations in the voltage across the transformer primary 180 relative to the voltage across the rheostat 185.

In operation, the rheostat 185 is adjusted to obtain a zero reading of the meter 188 at a known position of the reactor control rod, and inward or outward movement of the control rod will cause a change in the reading of the meter 188 to indicate movement from such position. The meter 188 is preferably calibrated to indicate the control rod position. It may be noted that by using the bridge arrangement, variations in the value of the excitation voltage will cause variations in both the voltage across the transformer primary 180 and the voltage across the rheostat 185 to minimize any effect on the reading of the meter 188.

It is a feature of the invention that the system is so designed and constructed as to minimize the effects of the high temperature of the water within the reactor casing 12 which, as previously indicated, may be at a temperature on the order of 600° F. It will be noted that the portion 20 of the casing and the cup-shaped cap 22 together form a generally tubular housing structure projecting outwardly from the casing. Heat will, of course, be dissipated from the exterior surface of this structure to the atmosphere and the structure will be at a progressively lower temperature as the distance from the casing wall 12 increases in an outward direction. All of the electrical components are located in the outer portion of this structure with the motor 102 being located at the extreme outer end. To increase the heat dissipation from the tubular housing structure and thus decrease the operating temperatures of the electrical components, fins are provided which project radially outwardly from this tubular housing of 20 and 21. These fins are arranged in a plurality of banks in axially spaced relation along this tubular structure to provide increased surface area and to obtain longitudinal interruptions to maintain a low conduction path from the infinite heat source. As shown in FIGURE 1, these axially spaced fins are illustrated by the partly broken away fins 20a on 20 and the partly broken away fins 21a on 21 which are also designated by the legend to clarify this disclosure and to make it clear that all of 20 and 21 may be so finned as described above.

It will be apparent that the above-described system can be modified in various ways. For example, the brake mechanism may comprise a ratcheting device operated by a solenoid through a four bar linkage to obtain force amplification, or instead of using the solenoid for brake actuation, a motor driven actuator may be provided incorporating a non-self locking jack screw and suitable release mechanism, whereby the same actuating force may be obtained over greater travel with the same power requirement of a solenoid. It is also possible to eliminate the spring 13 and the brake mechanism 43 by providing an auxiliary spring loaded piston which is latched in readiness to supply water to the chamber 17 and accomplish high speed inward movement in an emergency.

The above-described system can also be readily modified to accommodate a servo valve closed loop control system. The only fundamental alterations required are to place a torque motor servo on the reversing valve, to remove the brake mechanism and to add a computer circuit externally.

Referring to FIGURE 10, reference numeral 189 generally designates a servo valve which may be substituted for the reversing valve 34. The valve 189 has a passage 190 which may be connected to the conduit 39 to communicate with the pump inlet and a passage 191 which may be connected to the conduit 35 to communicate with the outlet of the pump through the control valve 36. The passage 190 normally communicates with a passage 192 which may be connected to the conduit 33 so as to communicate with the chamber 26 through the passage 31 and the passage 191 is normally in communication with a passage 193 which may be connected to the conduit 32 so as to be in communication with the chamber 17 through the passage 30. Accordingly, the flow will be from the chamber 26 to the passage 192, thence to the passage 190, thence to the inlet of the pump, thence from the pump outlet through the control valve to the passage 191, and thence through the passage 193 to the chamber 17, so as to produce inward movement of the reactor control rod.

A spool valve arrangement including inter-connected sections 194, 195 and 196 is movable to control flow and is also movable a substantial distance to the right from the illustrated position to connect the passage 190 with the passage 193 and connect the passage 191 with the passage 192 so as to reverse the flow, for outward movement of the reactor control rod. The spool valve is urged to a position approximately as illustrated by compression springs 197 and 198 acting against the opposite ends thereof, but is movable by controlling the fluid pressures applied to the opposite end faces of the sections 194 and 196. For this purpose, the passage 191 is connected through filters 199 and 200 and through restricted orifices 201 and 202 to tubes 203 and 204. Arms 205 and 206 of an armature 207 which is pivoted at an intermediate point on a shaft 208 are arranged to respectively control communication between the ends of the tubes 203 and 204 and a chamber 209 which communicates through an orifice 210 with the passage 190. The tube 203 communicates with a passage 211 which communicates with a chamber 212 to the left of the left-hand valve section 194 and the tube 204 communicates with a passage 213 which communicates with a chamber 214 to the right of the right-hand valve section 196. With the armature 207 in a neutral position, such as illustrated, and with the spool valve in the illustrated position, the pressure of the passage 190, which is connected to the pump inlet, will be applied to the right-hand face of the right-hand valve section 196, and there will be little resistance to flow from the tube 203 to the chamber 209 and through the tube 204 to the chamber 214 and to the passage 190, so that the pressure in the tube 203, which is applied through the passage 211 to the chamber 213, will be very little more than the pressure in the chamber 214. Accordingly, the spool valve may remain approximately in the position illustrated, or movable slightly to the right. If now the armature 207 is rotated in a counter-clockwise direction, the flow from the tube 203 to the chamber 209 will be decreased, there will be a smaller pressure drop across the orifice 201 and a higher pressure will be applied to the left-hand chamber 212 which will urge the spool valve to the right. If the flow from the tube 203 is restricted to a sufficient extent, the spool valve may be actuated to a position in which the direction of flow is reversed and in which communication between the chamber 214 and the passage 190 will be cut off. The flow will then be from the passage 191 through filters 199 and 200, through orifices 201 and 202, through the tubes 203 and 204 past the arms 205 and 206 to the chamber 209, and thence through the orifice 210 to the passage 190. The pressures applied to the left and right-hand ends of the spool valve are then controlled by varying the position of the armature 206. It will be appreciated that by varying the position of the armature to a slight extent, the position of the spool valve and the main flow may be accurately controlled with a very small actuating force. The actuating force is applied by passing currents through coils 215 and 216 which act magnetically on the armature 207, the armature being of magnetic material.

FIGURE 11 is a schematic wiring diagram for a system using servo control. In this system, the reversing valve solenoid and the brake solenoid of the circuit of FIGURE 8 are eliminated and, instead, a control circuit for the coils 215 and 216 is provided, this circuit being illustrated in block form and designated by reference numeral 217. One terminal 218 of the circuit 217 is connected to a bus 219; another terminal 220 is connectable to a bus 221 through a normally open contact 222 of a button 223 actuatable to cause outward movement of the reactor control rod; another terminal 224 is connectable to the bus 221 through series-connected normally closed contacts 225, 226, 227, 228 and 229 of buttons 230, 231, the button 223, button 232 and button 233, respectively; and a fourth terminal 234 is connected to a source of a tracking reference signal generally indicated by reference numeral 235.

The flow control actuating solenoid 74 has one terminal connected to the bus 219 and its other terminal connected through a normally open contact 236 of the button 231 to the bus 221; a field winding 106 of the pump-drive motor 102 is connectable between the busses 219 and 221 through a normally open relay contact 237 which is closed by energization of a relay coil 238 connectable between the busses 219 and 221 through a normally open contact 239 of the button 223 and also through a normally open contact 240 of the button 232; and the safety-valve actuating solenoid 61 is normally connected between the busses 219 and 221 through a normally closed contact 241 of the button 233. The bus 219 is connected to one side of a source of power and the bus 221 is connectable to the other side of the source through an on-off switch 242.

In operation, the on-off switch 242 is closed and which will energize the solenoid 61 to close the safety valve and which will apply the supply voltage to the terminals 218 and 224 of the control circuit 217. This will apply a signal to the coils 215 and 216 of the valve 189 in a manner such that the armature 207 will be moved in a counter-clockwise direction to obtain decreased flow through the tube 203 and increased pressure in the chamber 212 to cause the valve members 194, 195 and 196 to move to the right to an extent sufficient to cause the passages 192 and 193 to be closed off by the valve members 195 and 196 to hydraulically lock the reactor control rod against movement.

To move the control rod outwardly, the button 239 may be depressed to energize the pump-driving motor and to connect the bus 221 to the terminal 220 of the circuit 217 while disconnecting the terminal 224 from the bus 221. Applying the signal between the terminals 218 and 220 will cause energization of the coils 215 and 216 in a manner such as to urge the armature 207 in a counter-clockwise direction which will decrease the flow through the tube 203 and increase the pressure applied in the chamber 212 to cause movement of the valve members 194, 195 and 196 to the right to allow flow from the chamber 17 to the inlet of the pump and from the outlet of the pump through the control valve 36 to the chamber 26. The valve member-armature 73 of the control valve 36 will be in the position illustrated in FIGURE 3 so that flow will be through the relatively small orifice 82 so as to be at a relatively low rate which is maintained constant by operation of the diaphragm 84.

To move the reactor control rod inwardly at a slow rate, the button 230 is depressed to disconnect the terminal 224 from the bus 221 and allow the valve 189 to return to the illustrated position and the flow will be from the chamber 26 to the inlet of the pump and from the outlet of the pump through the control valve to the chamber 17, and at a relatively low rate as determined by the size of the orifice 82.

To move the control rod inwardly at a rapid rate, the button 231 is depressed which will disconnect the terminal 224 from the bus 221 to allow the valve 189 to return to the illustrated position and the solenoid 74 will be energized to move the valve member 73 to allow flow through the relatively large orifice 83.

In the event the control rod becomes stuck, the button 240 is depressed which will move the servo valve 189 to the illustrated position and will also energize the pump so that the force of the pump is applied to aid the action of the spring 13.

The operation of the circuit of FIGURE 11, as thus far described, is, thus essentially the same as that of the circuit of FIGURE 8. However, the circuit of FIGURE 11 is arranged for automatic operation. For this purpose, a switch 243 is closed to energize the relay 238 and effect energization of the pump driving motor and the terminal 224 of the circuit 217 will still be connected to the bus 221 through the contacts 225—229, and a signal will be applied to the coils 215, 216 of the modulating valve 189 which will rotatae the armature 207 in a counter-clockwise direction to restrict the flow from the tube 203 to the chamber 209 and increase the pressure applied through the passage 211 to the chamber 212, to move the valve members 194—196 to the right to a position in which flow between the passages 190, 191 and the passages 192, 193 will be blocked. The control rod will thus be hydromically locked in position.

To change the position of the control rod, a signal is applied at the terminal 234 from the source 235 which will either aid or oppose the signal applied at the terminal 224 to cause movement of the valve members 194—196 to obtain flow either from the chamber 26 to the chamber 17, or from the chamber 17 to the chamber 26 and movement of the reactor control rod inwardly or outwardly. The source 235 may include means responsive to changes in the position of the control rod (such as the coil 177 and the circuit of FIGURE 9) which may act to maintain the control rod in position despite leakage past the piston.

It will be understood that modifications and variations may be effected without departing from the spirit and scope of the novel concepts of this invention.

We claim as our invention:

1. An atomic reactor pile of the pressurized coolant type having a reactor pressure vessel casing including as a part thereof a restrictedly communicating, external actuator thimble extension means having heat rejecting surface means to cool it, the same hot pressurized liquid coolant being in both said casing and its said extension means but at a lower temperature in said cooled extension means, a control rod movable into or out of said pile to respectively reduce or increase the reactivity thereof, stored energy means connected to move said rod into said pile, an hydraulic cylinder at least in part in said extension means, a piston in said cylinder and operatively connected to said rod, and hydraulic and electrical actuating and control means comprising; an electric motor, pump means driven thereby and connected to supply a pressure difference of said hot liquid coolant across said piston to overcome said stored energy means and move said rod out of said pile, safety valve means connected to said cylinder across said piston to selectively prevent or permit emergency rapid inward scramming movement of said piston and rod by said stored energy means, safety electrical actuating means operatively connected thereto, normal control valve means operatively connected from said pump to said cylinder on opposite sides of said piston in parallel with said safety valve means for control of normal slower shimming motions, normal electrical actuating means operatively connected thereto, all of said hydraulic and electrical actuating and control means being located in said cooler extension means with said pressurized but lower temperature hot coolant liquid to eliminate the need for any moving seals, pipe penetrations, or secondary cooling and to provide a compact assembly wherein said immersed electric motor may be of minimum size and operate efficiently.

2. An atomic reactor pile of the pressurized coolant type having a reactor pressure vessel casing including as a part thereof external actuator thimble extension means having communication with said casing and having heat rejecting surface means to cool it, the same hot pressurized liquid coolant in both said casing and its said extension means but at a lower temperature in said cooled extension means, a control rod movable into or out of said pile to respectively reduce or increase the reactivity thereof, fail-safe stored energy means always ready and connected to rapidly move said control rod into said pile for emergency scramming, a hydraulic cylinder, a piston in said cylinder being at least in part in said extension means with its piston connected between the coolant liquid in said casing and in said extension means whereby said extension is heated upon a piston actuating supply of higher temperature coolant from said casing side to the extension side of said piston, and hydraulic and electrical actuating and control means comprising; an electric motor, pump means driven thereby and connected to supply a pressure difference of said hot liquid coolant across said piston to overcome said stored energy means and move said rod out of said pile, normal electrical actuating means, normal piston motion controlling valve means actuated thereby and operatively connected from said pump to both ends of said cylinder, safety electrical actuating means, safety valve means actuated thereby and connected to said cylinder across said piston and in parallel with said normal valve means to prevent or to permit inward scramming motion by said stored energy means, fail-safe electrical control means, and brake means actuated thereby to hold said piston and said control rod in any given position against inward motion by said stored energy means without requiring continuous operation of said pump means and whereby pump operation is required only for outward motion of said control rod and extension means heating actuations of said piston are minimized; all of said hydraulic and electrical actuation and control means being compactly arranged in the lower temperature liquid coolant in said extension means, said pile having means, including said heat rejecting surface means, to maintain a substantial temperature difference between the temperature of said coolant in said extension and in the rest of said pressure vessel casing.

3. An atomic reactor pile of the pressurized coolant type having a reactor pressure vessel casing including as a part thereof external actuator thimble extension means having heat rejecting surface means to cool it and a communication with said casing, the same hot pressurized liquid coolant in both said casing and its said extension means but at a lower temperature in said cooled extension means, a control rod movable into or out of said pile to respectively reduce or increase reactivity thereof, a fail-safe energy storing preloaded spring connected to rapidly move said control rod into said pile for emergency scramming, a hydraulic cylinder at least in part in said extension means, a piston in said cylinder and operatively connected to said control rod, said piston being connected between said casing and said extension means, and hydraulic and electrical actuating and control means comprising; an electric motor, a centrifugal pump directly connected to said electric motor and having a discharge connected to said cylinder to move its said piston and said rod outwardly against the force of said spring, electrical actuating means, normal piston motion controlling valve means actuated thereby and operatively connected from said pump to both ends of said cylinder, a normally closed safety valve connected to said cylinder across said piston in parallel with said normal valve means to normally prevent inward motion of said piston and said rod by said spring, said safety valve having a biasing piston area means exposed to the pressure of said coolant liquid in said casing to bias said valve towards its open position, and fail-safe electro-mechanical means to normally hold said safety valve closed; all of said hydraulic and electrical actuating and control means being in the lower temperature liquid coolant in said extension means, said pile having means, including said heat rejecting surface means, to maintain a substantial temperature difference between the temperature of said coolant in said extension and in the rest of said pressure vessel casing.

4. An atomic reactor pile of the pressurized coolant type having a reactor pressure vessel casing including as a part thereof a restrictedly communicating, external actuator thimble extension having heat rejecting surface means to cool it, the same hot pressurized liquid coolant in both said casing and its said extension but at a lower temperature in said cooled extension, a control rod movable into or out of said pile to respectively reduce or increase the reactivity thereof, stored energy means connected to move said rod into said pile, a hydraulic cylinder at least in part in said extension, a piston in said hydraulic cylinder and operatively connected to said rod, passage means connected across said piston, said piston and cylinder providing cooperating liquid coolant flow constricting means in said passage means and positioned to act only when said piston approaches the inner end of its travel to provide a damping action for said piston and said rod as it approaches its inner position, and hydraulic and electrical actuating and control means comprising; an electric motor driven pump means connected to said cylinder to supply a pressure difference of said hot liquid coolant across said piston to overcome said stored energy means and move said rod out of said pile, electrical actuating means, and piston motion controlling valve means actuated thereby and operatively connected from said pump to said cylinder across said piston; all of said hydraulic and electrical actuating and control means being located in the lower temperature coolant liquid in said extension.

5. An atomic reactor pile of the pressurized coolant type having a reactor pressure vessel casing including as a part thereof a restrictedly communicating, external actuator thimble extension means having heat rejecting surface means to cool it, the same hot pressurized liquid coolant being both in said casing and its said extension means but at a lower temperature in said cooled extension means, a control rod movable into or out of said pile to respectively reduce or increase the reactivity thereof, stored energy means connected to move said rod into said pile, a hydraulic cylinder at least in part in said extension means, a piston in said cylinder and operatively connected to said rod, and hydraulic and electrical actuating and control means comprising; an electric motor driven pump means operatively connected to said cylinder to supply a pressure difference of said hot coolant liquid across said piston to overcome said stored energy means and move said rod out of said pile, electrical actuating means, and a rod motion controlling valve means actuated thereby and operatively connecting said pump to said cylinder on both sides of said piston for outward motion of said piston by said pump and to permit inward motion of said piston by said stored energy means, said valve means including a substantially constant coolant flow maintaining valve means connected across said piston and to said pump and connected to act in either direction of piston motion to maintain a substantially constant predetermined speed of said piston when moved inwardly by said stored energy means and also when moved outwardly by said pump; all of said hydraulic and electrical actuating and control means being located in the lower temperature coolant liquid in said extension.

6. Actuating and control means for a pressurized liquid coolant type of atomic pile having a reactor control rod and a connected coolant liquid actuated piston in a cylinder which is at least partly in an external thimble extension of said pile casing; said actuating and control means being in said extension and comprising pump means having a connection to supply coolant liquid under pump pressure to at least one side of said cylinder to move said piston in at least one direction and means to control the piston and rod speed in at least said one direction of motion including a plurality of orificies of different sizes in parallel flow paths in the said connection between said pump and said cylinder, valve means movable to shut off coolant liquid flow through all but a selected one of said orifices whereby the orifices are selectively effective to control liquid flow rates and the corresponding piston and rod speeds at different values, and pressure controlling valve means connected across all of said orifices and movable to maintain a substantially constant pressure drop across whichever orifice is then open and effective.

7. An atomic reactor pile of the pressurized coolant type having a reactor pressure vessel casing including an external actuator thimble extension, hot coolant liquid under pressure in said casing and said thimble extension, a control rod movable into or out of said pile to respectively reduce or increase reactivity thereof, fail-safe stored energy means connected to said rod to move it into said pile, a hydraulic cylinder at least partly in said extension, a piston therein operatively connected to said rod, and hydraulic and electrical reactor actuating and control means in said extension comprising; pump means operatively connected to said cylinder to supply said hot coolant liquid under pressure to the inner side of said piston to overcome said stored energy means and move said rod out of said pile, normally closed safety valve means operatively associated with said cylinder and connected across said piston in parallel with said pump means to open a relatively large valve area thereacross to permit rapid and emergency scramming inward motion of said piston and rod by said stored energy means, solenoid means connected to normally hold said safety valve means closed, preloaded spring means connected to open said safety valve means upon power failure or inoperativeness of said solenoid means, and means operatively associated with said cylinder to control the normal slower shimming speed motions of said rod and piston in either direction including a piston speed regulating orifice and flow regulating valve means to provide a substantially constant pressure drop thereacross and a resulting substantially constant speed of said piston and control rod in either direction, said orifice and regulating valve means being connected from said pump to both ends of said cylinder, and a solenoid actuated reversing valve connected to said pump and to the two ends of said cylinder in parallel with said safety valve means and in series with said orifice and regulating valve means for speed regulation in either direction of normal actuation.

8. An atomic reactor pile of the pressurized coolant type having a reactor pressure vessel casing including an external thimble extension, hot coolant liquid under pressure in said casing and said thimble extension, a control rod movable into or out of said pile to respectively reduce or increase reactivity thereof, a fail-safe energy storing preloaded spring connected to said rod to move it into said pile, a hydraulic cylinder at least partly in said extension, a piston therein connected directly to said rod, pump means operatively connected to said cylinder to supply said coolant liquid under pump pressure to one side, at least, of said piston to overcome the preload force of said spring and move said rod out of said pile, normally closed safety valve means connected to said cylinder across said piston and in parallel with said pump means to open a relatively large valve area across said piston to permit rapid and emergency scramming inward motion of said piston and control rod by said stored energy spring, solenoid means connected to said safety valve means to open it upon power failure or upon inoperativeness of said solenoid means, and normal control valve means connected to said pump and to the two ends of cylinder to control the normal actuations of said rod in either direction, said normal control valve means including a plurality of speed regulating orifices each having a solenoid valve means connected in series with all of said orifices to provide a substantially constant pressure drop across a selected said orifice and thus maintain selected substantially constant speed of said control rod in either direction of motion thereof and a solenoid actuated reversing valve connected to the two ends of said cylinder in parallel with said safety valve means and to said pump and in series with said speed regulating orifices and regulating valve means for speed regulation in either direction of normal actuation.

9. An atomic reactor pile of the pressurized coolant type having a reactor pressure vessel casing including an external actuator thimble extension, hot liquid coolant under pressure in said casing and said thimble extension, a control rod movable into or out of said pile to respectively reduce or increase reactivity thereof, fail-safe stored energy means connected to said rod to move it into said pile, a hydraulic cylinder at least partly in said extension, a piston in said cylinder connected to said rod, and hydraulic and electrical control and actuating mechanism comprising; one directional and electric motor driven pump means connected to said cylinder on one side of said piston to move said rod out of said pile against the force of said stored energy means, safety valve means connected to said cylinder across said piston to open a relatively large valve area thereacross to permit inward scramming motion of said piston and said rod by said stored energy means, valve means for normal operation connected from said pump to each end of said cylinder to regulate coolant liquid flow in either direction for either direction of piston motion and solenoid actuated holding means connected between said piston and said cylinder to hold said piston and said rod against inward motion by said stored energy means only when said solenoid is energized to thus eliminate constant running of said electric motor pump, and fail-safe safety spring means to hold said holding means disengaged upon failure of power or inoperativeness of said solenoid.

10. An atomic reactor pile of the pressurized coolant type having a reactor pressure vessel casing including as a part thereof a restrictedly communicating, external actuator thimble extension means having heat rejecting surface means to cool it, the same hot pressurized liquid coolant being in both said casing and its said extension means but at a lower temperature in said cooled extension means, a control rod movable into or out of said pile to respectively reduce or increase the reactivity thereof, stored energy means connected to move said rod into said pile, an hydraulic cylinder at least in part in said extension means, a piston in said cylinder and operatively connected to said rod, and hydraulic and electrical actuating and control means comprising; an electric motor, pump means driven thereby and connected to supply a pressure difference of said hot liquid coolant across said piston to overcome said stored energy means and move said rod out of said pile, safety valve means connected to said cylinder across said piston to selectively prevent or permit emergency rapid inward scramming movement of said piston and rod by said stored energy means, safety electrical actuating means operatively connected thereto, normal control valve means operatively connected from said pump to said cylinder on opposite sides of said piston in parallel with said safety valve means for control of normal slower shimming motions, normal electrical actuating means operatively connected thereto, all of said hydraulic and electrical actuating and control means being located in said cooler extension means with said pressurized but lower temperature hot coolant liquid to eliminate the need for any moving seals, pipe penetrations, or secondary cooling and to provide a compact assembly wherein said immersed electric motor may be of minimum size and operate efficiently, and said normal control valve means being a servo-modulating valve to control said coolant liquid flow to either side of said piston and the corresponding movements of said piston and said rod in either direction.

References Cited in the file of this patent

UNITED STATES PATENTS

| | | |
|---|---|---|
| 1,176,379 | Lieb | Mar. 21, 1916 |
| 1,194,626 | Hersey | Aug. 15, 1916 |
| 2,133,494 | Waters | Oct. 18, 1938 |
| 2,277,836 | Arnold | Mar. 31, 1942 |
| 2,399,294 | Ray | Apr. 30, 1946 |
| 2,445,455 | Rights et al. | July 20, 1948 |
| 2,508,370 | Bozoian | May 23, 1950 |
| 2,671,317 | Heintzelman | Mar. 9, 1954 |
| 2,676,571 | Parsons | Apr. 27, 1954 |
| 2,679,727 | McLeod | June 1, 1954 |
| 2,685,838 | Weinfurt | Aug. 10, 1954 |
| 2,728,194 | Clark et al. | Dec. 27, 1955 |

OTHER REFERENCES

Perry: Chemical Engineers' Handbook, 3rd ed. (1950), pages 1328, 1329, 1419.

Nucleonics, vol. 13, (Nov. 1955), pages 116, 118, 120, 122, (article by Rice).

Schultz: Control of Nuclear Reactors and Power Plants, McGraw Hill (1955); pages 109–112, 98–101, 105–108, 120, 113–119, 274.